United States Patent [19]

Okamoto

[11] Patent Number: 5,219,387
[45] Date of Patent: Jun. 15, 1993

[54] DEVICE FOR SETTING GAP BETWEEN RIMS IN TIRE UNIFORMITY INSPECTING MACHINE

[75] Inventor: Masayoshi Okamoto, Kobe, Japan

[73] Assignee: Kabushiki Kaisha Kobe Seiko Sho, Kobe, Japan

[21] Appl. No.: 845,192

[22] Filed: Mar. 3, 1992

[30] Foreign Application Priority Data

Mar. 4, 1991 [JP] Japan .................. 3-037561

[51] Int. Cl.$^5$ ........................................... G01M 17/02
[52] U.S. Cl. ........................................... 73/146; 73/8
[58] Field of Search ............... 73/146, 8; 29/864, 351

[56] References Cited

U.S. PATENT DOCUMENTS 5,099,684  3/1992  Okamoto .............................. 73/146
5,107,702  4/1992  Iwama .................................. 73/146

Primary Examiner—Donald O. Woodiel
Attorney, Agent, or Firm—Oblon, Spivak, McClelland, Maier & Neustadt

[57] ABSTRACT

A rim gap setting device in a tire uniformity inspecting machine include upper and lower rims for mounting a tire, which are vertically movably fitted on opposed ends of upper and lower spindles, respectively. Upper and lower hydraulically locking devices are provided for locking the upper and lower rims from the inner circumferences thereof, and are mounted around the upper and lower spindles, respectively. Upper and lower hydraulically engaging devices are mounted on the upper and lower spindles and can be radially retreated by being hydraulically interlocked with the upper and lower hydraulically locking devices to be thereby engaged with the upper and lower rims on the locking operation of the upper and lower hydraulically locking devices, respectively.

4 Claims, 3 Drawing Sheets

DEVICE FOR SETTING GAP BETWEEN RIMS IN TIRE UNIFORMITY INSPECTING MACHINE

BACKGROUND OF THE INVENTION

1. Field of the Invention

The present invention relates to a device for setting a gap between rims in a tire uniformity inspecting machine.

2. Description of the Prior Art

A tire uniformity has been measured with a tire uniformity inspecting machine by mounting a tire to upper and lower spindles through upper and lower rims and pushing a loadwheel to the tire being rotated around the axis of the spindles.

The above-mentioned tire uniformity inspecting machine has such a device as shown in FIG. 4, which can automatically set a gap between the upper and lower rims within the range from $L_1$ to $L_2$.

In FIG. 4, upper and lower spindles 1 and 2 are mounted at the end portions of upper and lower supporting shafts 3 and 4 by bolts 5 and 6 so as to be coaxially and vertically opposed to each other, respectively. The upper and lower supporting shafts 3 and 4 are rotatably supported to bearing cases 9 and 10 through bearings 7 and 8, respectively. The upper supporting shaft 3 is rotated around the axis by a drive motor (not shown) while the lower supporting shaft 4 is liftably supported by a lifting means (not shown). The upper spindle 1 has a tapered recessed portion 11 at its lower end while the lower spindle 2 has a tapered projecting portion 12, so that the lower spindle 2, while being lifted, is fitted and connected to the upper spindle 1.

Upper and lower rims 13 and 14 are fitted around the outer circumferences of the upper and lower spindles 1 and 2 so as to be vertically slidable and also removable, and are locked at the suitable positions by upper and lower hydraulically locking means 15 and 16 from the inner circumferential sides thereof, respectively. In addition, FIG. 4 shows the upper and lower rims 13 and 14 whose configurations are different from each other on the right and left sides, and which are vertically changeable between the real line position and the dotted line position, respectively. Accordingly, in this case, the gap between the upper and lower rims 13 and 14 can be suitably set within the range from $L_1$ to $L_2$.

The upper and lower hydraulically locking means 15 and 16 include oil chambers 17 and 18 in the inner circumferences thereof, and expansible rings 19 and 20 fitted around the spindles 1 and 2 by nuts 21 and 22, respectively. The oil chambers 17 and 18 are fluidly communicated to oil chambers 25 and 26 located at the center portions of the spindles 1 and 2 through oil passages 23 and 24, respectively. The oil chambers 25 and 26 include rams 29 and 30 of air cylinders 27 and 28, respectively. The air cylinders 27 and 28 include cylinder chambers 31 and 32 formed within the spindles 1 and 2, pistons 33 and 34 slidably fitted within the cylinder chambers 31 and 32, and rams 29 and 30 integrated with the pistons 33 and 34, respectively. The pistons 33 and 34 are energized by springs 35 and 36 to pressurize oils within the oil chambers 25 and 26, respectively. Air chambers 37 and 38 are formed to apply air pressure against the pressing forces of the springs 35 and 36, respectively. The air chambers 37 and 38 are connected from passages 39 and 40 formed in the rams 29 and 30 through a piping 41 and a passage 42 to air sources (not shown), respectively. Accordingly, when air pressures in the air chambers 37 and 38 of the air cylinders 27 and 28 are released, the springs 35 and 36 push the pistons 33 and 34, and rams 29 and 30, to thereby pressurize the oils in the oil chambers 25 and 26, respectively. As a result, the pressures in the oil chambers 17 and 18 are increased to radially outwardly expand the expandable rings 19 and 20 and hence lock the upper and lower rims 13 and 14 from the inner circumferential sides thereof, respectively. In addition, the ram 29 is fitted around the outer circumference of a sleeve 43.

A locking arm 44 is pivotably mounted on the bearing case 9 with a pin 45, and which includes at its lower end an engaging portion 46 detachably engaged with the flange portion of the upper rim 13 and at the upper end an engagement/disengagement operating means connected thereto.

The upper and lower rims 13 and 14 can be locked around the upper and lower spindles 1 and 2 from the inner circumference sides thereof by hydraulically expanding the expandable rings 19 and 20 of the upper and lower hydraulically locking means 15 and 16, respectively. The gap between the upper and lower rims 13 and 14 can be set within the range from $L_1$ to $L_2$, to thereby rapidly correspond to the change in tire size.

A test is carried out with use of a tire T applied with compressed air therein for setting the same condition as the real running one. The upper and lower rims 13 and 14 are thus applied with the vertical forces $F_1$ and $F_2$, for example, up to 20 tons at maximum in a PC tire, respectively. Accordingly, the locking mechanism depending on only the upper and lower hydraulically locking means 15 and 16 using the expandable rings 19 and 20 is disadvantageous in that the upper and lower rims 13 and 14 tend to slip at the time of applying compressed air into the tire T, thereby causing the rim gap to be changed. For the countermeasure to solve the aforesaid disadvantage, it may be considered to reinforce the fixing forces of respective upper and lower hydraulically locking means 15 and 16. The countermeasure, however, has a limitation in terms of the construction because of the locking mechanism thereof depends on the frictional resistance.

SUMMARY OF THE INVENTION

It is therefore an object of the present invention to provide a device for securing the upper and lower rims at the positions in which the rim gap is set, thereby preventing the change in the rim gap.

To achieve the aforesaid object, the present invention provides a rim gap setting device in a tire uniformity inspecting machine including: upper and lower rims for mounting a tire which are vertically movably fitted on opposed ends of upper and lower spindles, respectively; and upper and lower hydraulically locking means for locking the upper and lower rims from the inner circumferences thereof which are mounted around said upper and lower spindles, respectively, the rim gap setting device comprising:

upper and lower hydraulically engaging means mounted on the upper and lower spindles which can be radially retreated by being interlocked with the upper and lower hydraulically locking means to be thereby engaged with the upper and lower rims on the locking operation of the upper and lower hydraulically locking means, respectively.

The upper and lower rims 13 and 14 are vertically moved to adjust the rim gap, and are then locked around the upper and lower spindles 1 and 2 from the inner circumferences thereof by feeding pressurized oils to the upper and lower locking means 15 and 16, respectively. In this case, the upper and lower hydraulically engaging means 50 and 51 are projected by being interlocked with the upper and lower hydraulically locking means 15 and 16 to be engaged with the upper and lower rims 13 and 14, respectively. Accordingly, even when the tire T is applied with air pressure therein, the upper and lower rims 13 and 14 are prevented from vertically slipping with respect to the upper and lower spindles 1 and 2, and therefore, the rim gap is kept fixed during the test.

PREFERRED EMBODIMENTS OF THE INVENTION

Figure 4:
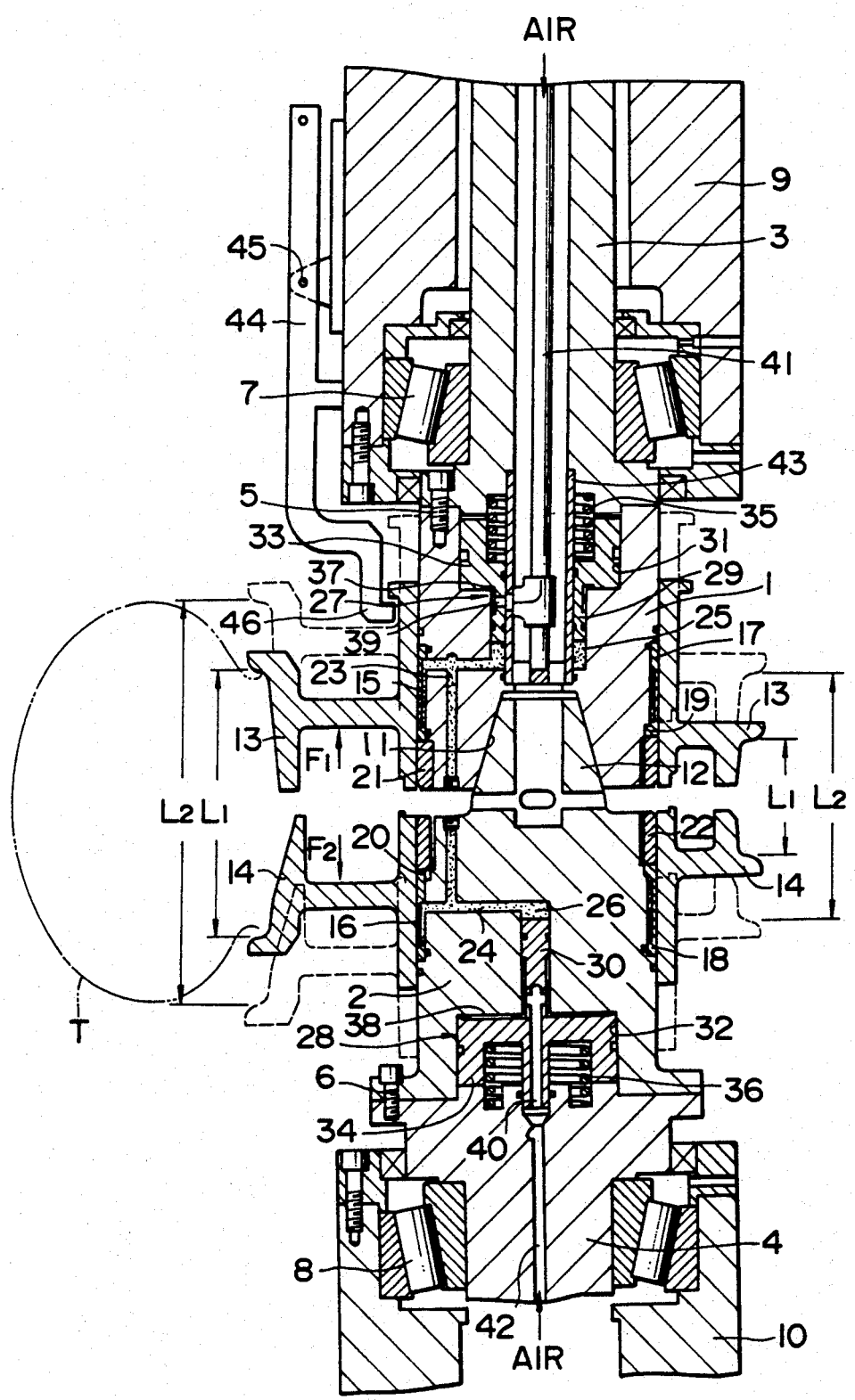
FIG. 4 is a sectional view showing the prior art.

The exemplary embodiment according to the present invention will be described with reference to the drawings. The same parts are indicated at the same reference numerals in FIG. 4, respectively and the explanation thereof is omitted.

Figure 1:
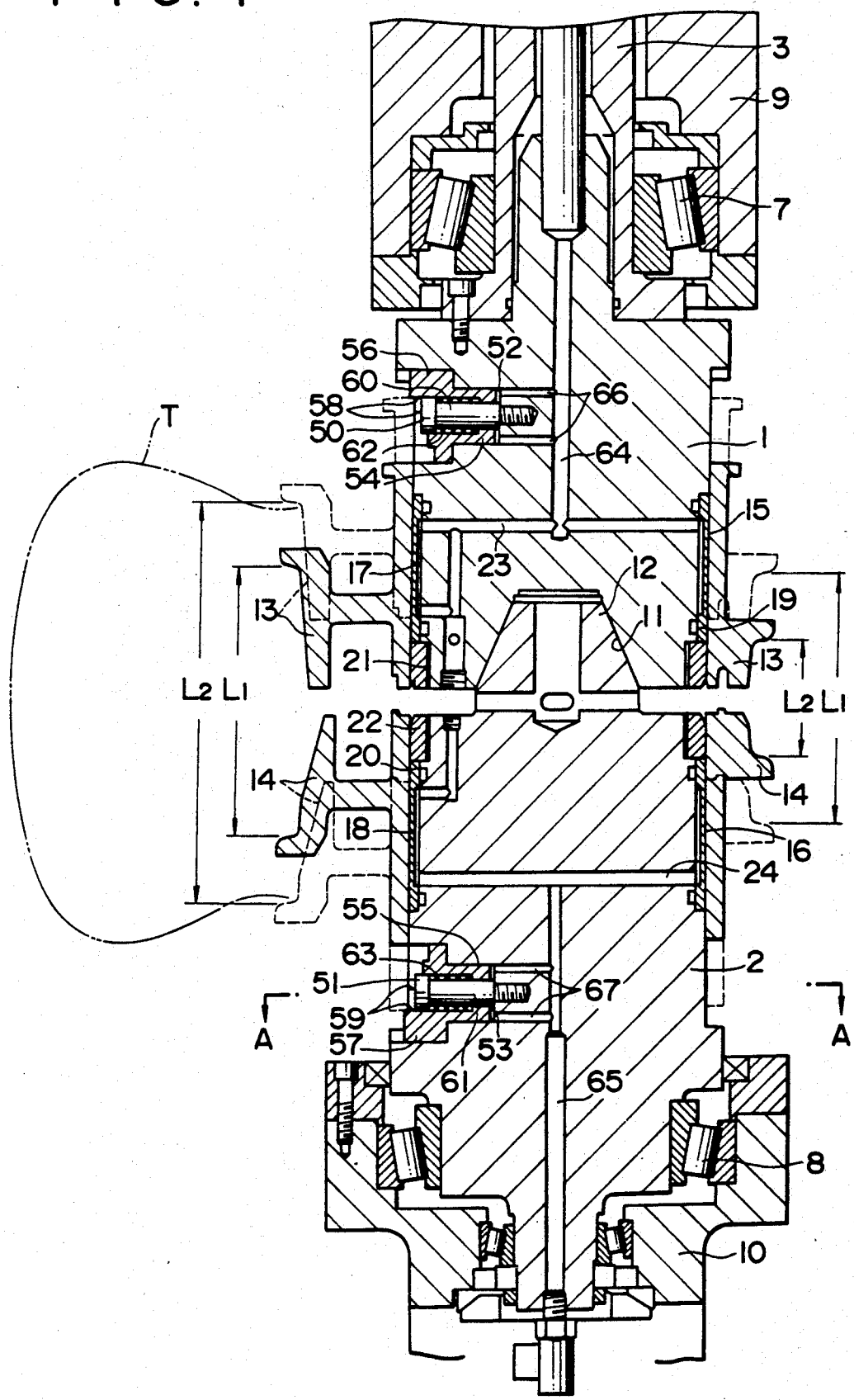
FIG. 1 is a sectional view showing one embodiment according to the present invention.

Referring to FIG. 1, upper and lower spindles 1 and 2 include upper and lower hydraulically locking means 15 and 16, and also upper and lower hydraulically engaging means 50 and 51 engaged with the end portions of upper and lower rims 13 and 14 for restricting the vertical movements of the upper and lower rims 13 and 14, respectively.

Figure 2:
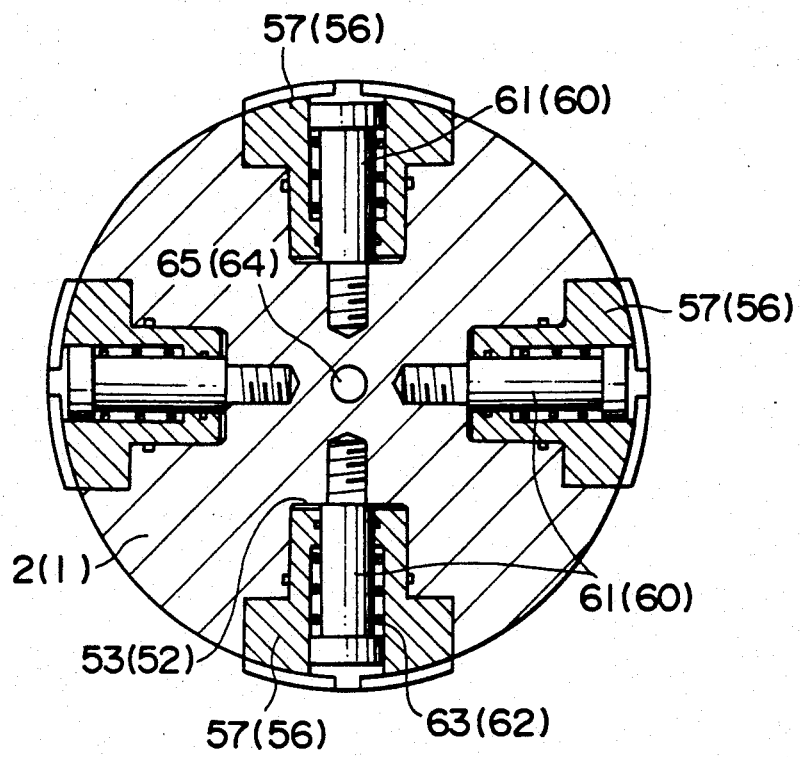
FIG. 2 is an enlarged view taken on line A—A in FIG. 1.
Figure 3:
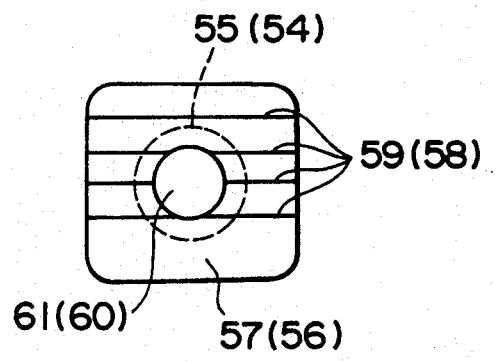
FIG. 3 is a front view of an engagement head.

As shown in FIGS. 2 and 3, the upper and lower hydraulically engaging means 50 and 51 include oil chambers 52 and 53 radially formed within the upper and lower spindles 1 and 2, respectively. The oil chambers 52 and 53 internally include pistons 54 and 55 which are radially retreatable. The pistons 54 and 55 have square engagement heads 56 and 57, which include a plurality of engagement portions 58 and 59 steppedly formed at the outer ends thereof, respectively. The pistons 54 and 55 are prevented from being loosen by stopper bolts 60 and 61 screwed to the upper and lower spindles 1 and 2, and are pressed radially inwardly by springs 62 and 63, respectively.

The oil chambers 52 and 53 are connected to hydraulic passages 64 and 65 formed at the center portions of the upper and lower spindles 1 and 2 through the (hydraulic means) branch passages 66 and 67 to be intercommunicated with the oil chambers 17 and 18 of the upper and lower hydraulically locking means 15 and 16 through oil passages 23 and 24, respectively. Accordingly, in the upper and lower hydraulically engaging means 50 and 51, the pistons 54 and 55 can be radially retreated by being interlocked with the locking actions of the upper and lower hydraulically locking means 15 and 16, respectively.

With the aforesaid construction, in the case of setting a gap between the upper and lower rims 13 and 14, the rim supporting arms (not shown) are vertically moved, for example, to set the upper and lower rims 13 and 14 at the dotted line positions as shown on the left side in FIG. 1. In this case, for example, there can be vertically formed a gap of several mm order between the uppermost engagement portion 58 of the engagement head 56 formed on the piston 54 of the upper hydraulically engaging means 50 and the upper end of the upper rim 13. Subsequently, pressurized oil is fed through the oil pressure passage 64 to radially outwardly expand the expandable ring 19 of the upper hydraulically engaging means 15, and thereby the upper rim 13 is locked around the upper spindle 1 by the upper hydraulically locking means 15.

Since the pressurized oil in the hydraulic passage 64 is simultaneously fed to the oil chambers 52 of the upper hydraulically engaging means 50 through the branch passage 66, the piston 54 is radially outwardly projected by being fluidically interlocked with the upper hydraulically locking means 15, thereby causing the outer end of the engagement head 58 to abut on the inner circumference of the upper rim 13.

Likewise, the lower rim 14 is locked around the lower spindle 2 by the lower hydraulically locking means 16, and the piston 55 of the lower hydraulically engaging means 51 is projected by being fluidically interlocked with the lower hydraulically engaging means 51, whereby causing the outer end of the engagement head 57 to abut on the inner circumference of the lower rim 14.

In the test of the tire T, the tire T is mounted between the upper and lower rims 13 and 14, and is then applied with compressed air therein. The upper and lower rims 13 and 14 are applied with the vertical forces $F_1$ and $F_2$ due to the air pressure, and are then vertically slid by a distance of a several mm order to be engaged with the engagement portions 58 and 59, respectively. Consequently, the the upper and lower rims 13 and 14 are located at the specified positions, respectively.

Accordingly, each of the upper and lower hydraulically locking means 15 and 16 may serve only to prevent the slipping, resulting in a reduced size thereof so that they can be housed in the specified portion with ease, and consequently the whole construction may be compact. Furthermore, the upper and lower rims 13 and 14 can be secured to thereby prevent the vertical slippage.

What is claimed is:

1. A rim gap setting device in a tire uniformity inspecting machine including:
   upper and lower spindles;
   upper and lower rims for mounting a tire, vertically movably fitted on opposed ends of the upper and lower spindles, respectively;
   upper and lower hydraulically locking means for locking said upper and lower rims from inner circumferences thereof mounted around said upper and lower spindles, respectively;
   upper and lower hydraulically engaging means mounted on said upper and lower spindles, said hydraulically engaging means being fluidically interlocked with said upper and lower hydraulically locking means and including elements which engage with said upper and lower rims when said upper and lower hydraulically locking means lock said upper and lower rims, respectively.

2. The rim gap setting device of claim 1 wherein said hydraulically locking means include expansible rings engageable with the inner circumference of the upper and lower rims, respectively, and hydraulic means for pressing the expansible rings outwardly to respectively lock the upper and lower rims.

3. The rim gap setting device of claim 2 wherein said hydraulically engaging means include pistons respectively sliding in said upper and lower spindles, said pistons each having an engagement portion comprising the element which engages the respective upper and lower rim, and hydraulic means interconnected with the hydraulic means of said hydraulically locking means for sliding the pistons such that the engagement portions thereof engage the upper and lower rims, respectively.

4. The rim gap setting device of claim 3 including springs for pressing the pistons away from the upper and lower rims, respectively.

* * * * *